Figure 1:
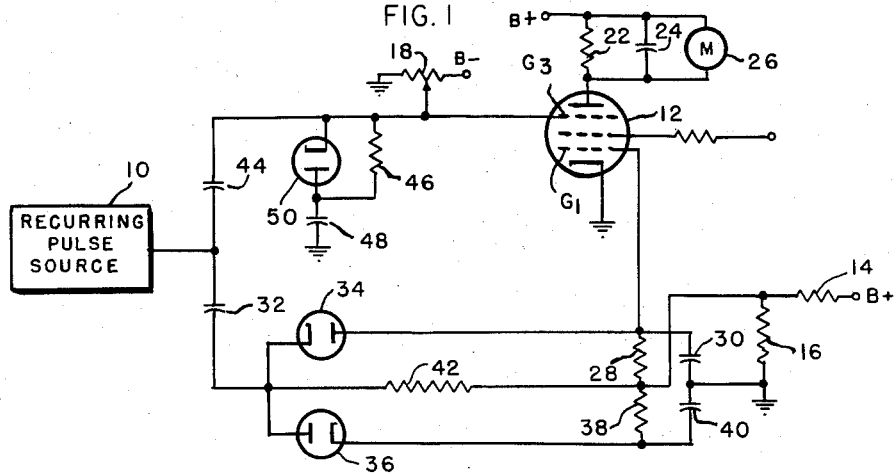

Sept. 9, 1958  H. BRETT  2,851,600

PULSE REPETITION COUNTER

Filed March 4, 1957

INVENTOR.
HERBERT BRETT

BY

*Harry M. Saragovitz*

ATTORNEY

United States Patent Office 2,851,600
Patented Sept. 9, 1958

2,851,600

PULSE REPETITION COUNTER

Herbert Brett, Fair Haven, N. J., assignor to the United States of America as represented by the Secretary of the Army Application March 4, 1957, Serial No. 643,899

6 Claims. (Cl. 250—27)

(Granted under Title 35, U. S. Code (1952), sec. 266)

The invention described herein may be manufactured and used by or for the Government for governmental purposes, without the payment of any royalty thereon.

This invention relates to timing circuits and more particularly to a means for automatically determining the repetition rate of pulses which recur periodically at a uniform rate.

It is common practice to determine the repetition rate of uniformly recurring pulses by utilizing a synchroscope wherein the time difference between pulses is measured by means of calibrated scales. This method usually requires a manual calibration adjustment for each different pulse recurring frequency to be measured and also consumes the time of an observer whose services may be required for more important duties. Moreover, the weight and size of such synchroscopes makes them unsuitable for use in equipment where light weight and portability are important factors.

It is therefore an object of the present invention to provide a circuit wherein the repetition frequency of a uniformly recurring pulse is automatically determined.

It is another object of the present invention to provide a simple automatic pulse repetition counter particularly suitable for use in lightweight portable radar systems.

Briefly, the pulse repetition rate determining circuit of the present invention includes a source of uniformly recurring pulses of negative polarity with respect to ground and a pentode type vacuum tube. Also included are means for initially biasing the control and suppressor grids of the pentode tube positive and negative, respectively, whereby the tube is normally non-conducting. In addition, there is provided means including a first resistor-capacitor integrating network connected to the suppressor grid and responsive to successive output pulses such that the negative bias on the suppressor grid is decreased at the end of the first of the successive pulses, maintained constant for the duration between the successive pulses, and increased at the start of the second successive pulse. Further included are means including a second and third resistor-capacitor integrating network in circuit with the control grid and responsive to said two successive pulses such that the positive bias on the control grid is decreased at the start of the first of the successive pulses, maintained constant for the duration of the first pulse and the duration between the successive pulses, and further decreased at the start of the second successive pulse. Due to the biases applied simultaneously to both the suppressor and control grids, the pentode tube is rendered conductive only for the duration between two successive pulses and rendered non-conductive at the start of the second successive pulse. Also included is a fourth integrating network in circuit with the plate of the pentode and including a capacitor adapted to be charged by the plate current when the tube is rendered conductive, the charge on the capacitor being a function of the duration between successive pulses.

Figure 2:
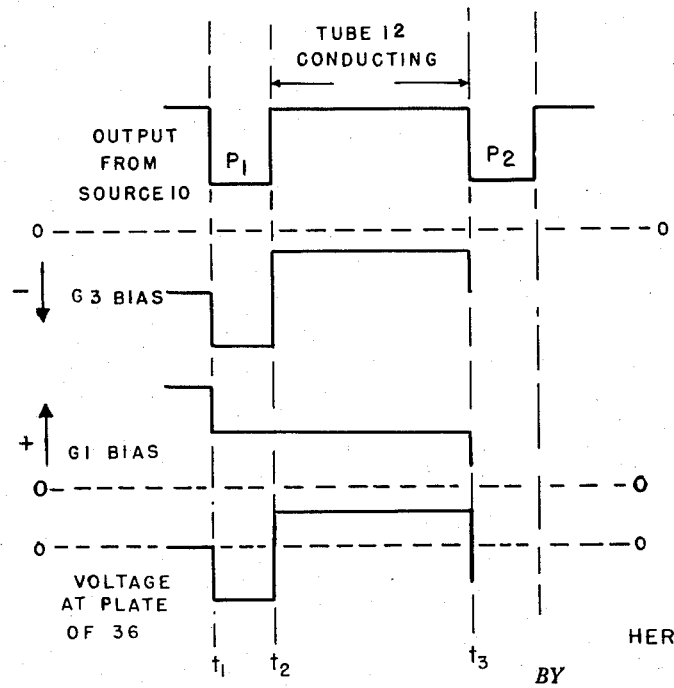

For a better understanding of the invention together with other and further objects thereof, reference is had to the following description taken in connection with the accompanying drawings in which:

Fig. 1 is a schematic diagram of the invention; and
Fig. 2 illustrates a group of explanatory curves.

Referring now to Fig. 1 of the drawing, at 10 there is shown a source of negative pulses which recur periodically at a prescribed repetition frequency which is to be measured. 12 is a vacuum tube having an extremely sharp cut-off characteristic and is shown herein as a pentode, preferably a 6BN6 type tube. A positive bias voltage is applied to control grid $G_1$ by means of voltage dividing resistors 14 and 16 connected in series between B+ and ground while the suppressor grid $G_3$ is biased negatively through the movable contact arm of a potentiometer 18 connected between B— and ground. The magnitude of the biases applied to grids $G_1$ and $G_3$ are such that tube 12 is normally non-conductive. The plate of tube 12 is connected to B+ through resistor 22 which is in parallel circuit arrangement with capacitor 24 and a vacuum tube voltmeter 26. As will hereinafter be explained, resistor 22 and capacitor 24 comprise an integrating circuit across which there is developed a voltage which is a function of the duration between two successive pulses from source 10.

Connected to control grid $G_1$ is an integrating circuit comprising a resistor 28 connected between grid $G_1$ and the junction of resistors 14 and 16, and a capacitor 30 connected between grid $G_1$ and ground. The output of pulse source 10 is coupled through capacitor 32 and diode 34 to grid $G_1$ with the plate of diode 34 being connected to grid $G_1$ as shown. Coupling capacitor 32 is also connected through diode 36 to an integrating circuit comprising resistor 38 and capacitor 40. As shown, capacitor 40 is connected between the cathode of diode 36 and ground and resistor 38 is in series connection with the cathode of diode 36 and resistor 28. The plate of diode 36 is connected to the cathode of diode 34 and a resistor 42 is connected between the junction of integrating resistors 28 and 38 and the cathode of diode 34 to provide a direct-current return path for both diodes. The output of pulse source 10 is also coupled to suppressor grid $G_3$ of tube 12 through coupling capacitor 44. Connected between grid $G_3$ and ground is a series connected integrating circuit comprising resistor 46 and capacitor 48. A diode 50 is connected across resistor 46 with its plate connected to the junction of resistor 46 and capacitor 48 and its cathode connected to suppressor grid $G_3$. Coupling capacitors 32 and 44 and integrating circuit capacitors 30, 40 and 48 are all of equal value as are the values of integrating circuit resistors 28, 38 and 46. Resistor 42 is relatively large in comparison to the value of the integrating circuit resistors. All the integrating circuits hereinabove described have a relatively long time constant with respect to the time between successive pulses applied from source 10.

The curves shown in Fig. 2 illustrate the operation of the circuit. It is to be assumed that the duration of the negative pulses is much less than the duration between pulses. At time $t_1$, the negative pulse $P_1$ is applied simultaneously across two capacitor voltage divider networks through respective diodes 34 and 50. One voltage dividing network comprises coupling capacitor 44 and integrating circuit capacitor 48 and the other voltage dividing network comprises coupling capacitor 32 and integrating circuit capacitor 30. Since the diodes 34 and 50 are rendered conductive for the duration of pulse $P_1$, the voltages applied to suppressor grid $G_3$ and control grid $G_1$ are the voltages developed across integrating circuit capacitors 48 and 30, respectively.

Assuming for example, a —100 volt pulse from source 10, then, for the pulse duration $t_1$—$t_2$, the negative bias on $G_3$ will increase by —50 volts and the positive bias on $G_1$ will decrease by 50 volts so that tube 12 will remain cut-off. At time $t_2$, the relatively positive voltage represented by the trailing edge of $P_1$ will be applied directly to $G_3$, since diode 50 is now non-conductive. As a result, $G_3$ will now be 50 volts more positive than the initial negative bias applied thereto. Since at time $t_2$ diode 34 is also non-conductive, grid $G_1$ will not be affected and the voltage at grid $G_1$ is maintained at a constant level from time $t_1$ to time $t_3$, at which time the next pulse is applied from source 10, due to the action of the integrating circuit comprising capacitor 30 and resistor 28. Also, the voltage on grid $G_3$ will remain at a constant level from time $t_2$ to time $t_3$ due to the action of the integrating circuit comprising resistor 46 and capacitor 48. However, for the duration $t_2$ to $t_3$, diode 36 will be rendered conductive for one-half the 100 volt amplitude represented by the trailing edge of $P_1$, and due to the action of the voltage dividing network comprising capacitor 32 and capacitor 40, the voltage at the common connection of the plate and cathode of respective diodes 36 and 34 will be +25 volts for the duration $t_2$ to $t_3$. With grid $G_3$ now more positive for the duration $t_2$ to $t_3$ than at $t_1$ as hereinabove explained tube 12 will be rendered conductive for the duration $t_2$—$t_3$ and the plate current drawn by tube 12 will charge capacitor 24 for as long as tube 12 remains conductive. At time $t_3$ when another negative pulse $P_1$ is applied from source 10, grid $G_3$ will become more negative because diode 50 is again rendered conductive so that another —50 volts is applied to grid $G_3$ due to the action of the voltage divider network comprising capacitor 44 and capacitor 48. Also at time $t_3$ diode 36 will be rendered non-conductive and diode 34 will be rendered conductive. Since +25 volts is applied at the cathode of diode 34 at time $t_3$ as hereinabove explained, the total voltage applied to the voltage dividing network comprising capacitor 32 and capacitor 30 will be —75 volts. Thus, an additional —37.5 volts will be applied to the integrating circuit comprising capacitor 30 and resistor 28, and hence an additional —37.5 volts is also applied to grid $G_1$. With grid $G_3$ and $G_1$ both becoming more negative simultaneously at time $t_3$, the combined grid biases will cause tube 12 to be cut-off at time $t_3$. The amount of voltage developed across capacitor 24 will then be a function of the duration $t_2$—$t_3$ which is measured by meter 26. Hence meter 26 is calibrated to measure the time difference between $t_2$ and $t_3$ to determine the rate of the pulses from source 10.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A pulse repetition rate determining circuit comprising, a source of uniformly recurring pulses of negative polarity, a pentode type vacuum tube having a control grid, a suppressor grid and a plate, means for initially biasing said control grid positive and said suppressor grid negative whereby said tube is normally non-conducting, means including a first resistor-capacitor integrating circuit connected to said suppressor grid and responsive to two successive output pulses such that the negative bias on said suppressor grid is decreased at the end of the first of said successive pulses, maintained constant for the duration between said successive pulses and increased at the start of the second of said successive pulses, means including a second and third resistor-capacitor integrating circuit in circuit with said control grid and responsive to said two successive pulses such that the positive bias on said control grid is decreased at the start of the first of said successive pulses, maintained constant for the duration of said first pulse and the duration between successive pulses and further decreased at the start of said second successive pulse, said pentode being rendered conductive for the duration between said successive pulses and rendered non-conductive at the start of the second of said successive pulse, and a fourth integrating circuit in circuit with said plate and including a capacitor adapted to be charged by the plate current when said tube is rendered conductive, the charge on said capacitor being a function of the duration between said successive pulses.

2. A pulse repetition rate determining circuit comprising, a source of uniformly recurring pulses of negative polarity with respect to ground, a pentode type vacuum tube having a control grid, a suppressor grid and a plate, means for initially biasing said control grid positive and said suppressor grid negative whereby said tube is normally non-conducting, means including a first resistor-capacitor integrating circuit connected to said suppressor grid and responsive to two successive output pulses such that the negative bias on said suppressor grid is decreased at the end of the first of said successive pulses, maintained constant for the duration between said successive pulses and increased at the start of the second of said successive pulses, a pair of diodes having a respective cathode and a respective anode in common connection, a coupling capacitor connected between said common connection and the output of said source, a pair of discrete resistor-capacitor integrating circuits, one of said integrating circuits being connected to said control grid and the free anode of one of said pair of diodes, the other of said integrating circuits being connected to the free cathode of one of said pair of diodes, each of the integrating capacitors and its associated diode forming a discrete voltage dividing network with said coupling capacitor, said voltage dividing networks and said pair of integrating circuits being responsive to said two successive pulses such that the positive bias on said control grid is decreased at the start of the first of said successive pulses, maintained constant for the duration of said first pulse and the duration between said successive pulses, and further decreased at the start of the second of said successive pulses, said pentode being rendered conductive for the duration between said successive pulses and rendered non-conductive at the start of the second of said successive pulses, and a resistor-capacitor integrating circuit in circuit with said plate and including a capacitor adapted to be charged by the plate current when said tube is rendered conductive, the charge on said capacitor being a function of the duration between said successive pulses.

3. A pulse repetition rate determining circuit comprising, a source of uniformly recurring pulses of negative polarity with respect to ground, a pentode type vacuum tube having a control grid, a suppressor grid and a plate, means for initially biasing said control grid positive and said suppressor grid negative whereby said tube is normally non-conducting, a coupling capacitor connected between said suppressor grid and the output of said source, a series connected resistor-capacitor integrating circuit connected between said suppressor grid and ground, a diode connected across the resistor of said integrating circuit and having its cathode connected to said suppressor grid, said diode, said series integrating capacitor, and said coupling capacitor forming a voltage dividing network, said voltage dividing network and said integrating circuit being responsive to two successive pulses from said source such that the negative bias on said suppressor grid is decreased at the end of the first of said successive pulses, maintained constant for the duration between said successive pulses and increased at the start of the second of said successive pulses, means including a second and third resistor-capacitor integrating circuit in circuit with said control grid and responsive to said two successive pulses such that the positive bias on said control grid is decreased at the start of the first of said successive pulses, maintained constant for the duration of said first pulse and the duration between said successive pulses and further decreased at the start of the second of said successive pulses, said pentode being rendered conductive for the duration between said successive pulses and rendered non-conductive at the start of the second of said successive pulses, and a fourth integrating circuit in circuit with said plate and including a capacitor adapted to be charged by the plate current when said tube is rendered conductive, the charge on said capacitor being a function of the duration between successive pulses.

4. A pulse repetition rate determining circuit comprising, a source of uniformly recurring pulses of negative polarity with respect to ground, a pentode type vacuum tube having a control grid, a suppressor grid and a plate, means for initially biasing said control grid positive and said suppressor grid negative whereby said tube is normally non-conducting, a first coupling capacitor connected between said suppressor grid and the output of said source, a series connected resistor-capacitor integrating circuit connected between said suppressor grid and ground, a diode connected across the resistor of said integrating circuit and having its cathode connected to said suppressor grid, said first coupling capacitor, said diode and the capacitor of said integrating circuit forming a first voltage dividing network, said first voltage dividing network and said integrating circuit being responsive to two successive pulses from said source such that the negative bias on said suppressor grid is decreased at the end of the first of said successive pulses, maintained constant for the duration between said successive pulses and increased at the start of the second of said successive pulses, a pair of diodes having a respective cathode and a respective anode in common connection, a second coupling capacitor connected between said common connection and the output of said source, a second and third resistor-capacitor integrating circuit, said second integrating circuit being connected to said control grid and the free anode of one of said pair of diodes, said third integrating circuit being connected to the free cathode of the other of said pair of diodes, each of the capacitors of said second and third integrating circuits and their associated diodes forming discrete second and third voltage dividing networks with said second coupling capacitor, said second and third voltage dividing networks and said second and third integrating circuits being responsive to said two successive pulses such that the positive bias on said control grid is decreased at the start of the first of said successive pulses, maintained constant for the duration of said first pulse and the duration between the second of said successive pulses, and further decreased at the start of said second pulse, said pentode being rendered conductive for the duration between said successive pulses and rendered non-conductive at the start of the second of said successive pulses, and a fourth integrating circuit in circuit with said plate and including a capacitor adapted to be charged by the plate current when said tube is rendered conductive, the charge on said capacitor being a function of the duration between said successive pulses.

5. The circuit in accordance with claim 4 wherein the integrating resistors of said second and third integrating circuits are in series connection across the free anode and free cathode of said pair of diodes, and the integrating capacitors of said second and third integrating circuits are connected respectively between ground and the junction of said integrating resistors with the free anode and free cathode of said pair of diodes.

6. The circuit in accordance with claim 5 wherein said first coupling capacitor, said second coupling capacitor, and the respective integrating circuit capacitors are equal in value, and the respective integrating circuit resistors are of equal value.

References Cited in the file of this patent
UNITED STATES PATENTS

| | | |
|---|---|---|
| 2,255,692 | Wilson | Sept. 9, 1941 |
| 2,676,254 | Valeton | Apr. 20, 1954 |
| 2,776,370 | Beveridge et al. | Jan. 1, 1957 |

FOREIGN PATENTS

| | | |
|---|---|---|
| 148,740 | Sweden | Feb. 8, 1955 |